(12) United States Patent
You et al.

(10) Patent No.: US 10,824,691 B2
(45) Date of Patent: Nov. 3, 2020

(54) PAGE RENDERING METHOD, DEVICE, AND DATA STORAGE MEDIUM

(71) Applicant: Tencent Technology (Shenzhen) Company Limited, Shenzhen (CN)

(72) Inventors: Shunhang You, Shenzhen (CN); Hao Hu, Shenzhen (CN); Chao Lin, Shenzhen (CN); Haojun Hu, Shenzhen (CN); Jisheng Huang, Shenzhen (CN); Weibang Luo, Shenzhen (CN); Haitian Peng, Shenzhen (CN); Yuyang Peng, Shenzhen (CN); Zhe Cheng, Shenzhen (CN); Xuyu Gui, Shenzhen (CN); Canhui Huang, Shenzhen (CN); Qingjie Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 70 days.

(21) Appl. No.: 16/290,642

(22) Filed: Mar. 1, 2019

(65) Prior Publication Data

US 2019/0197068 A1    Jun. 27, 2019

Related U.S. Application Data

(63) Continuation of application No. PCT/CN2017/111274, filed on Nov. 16, 2017.

(30) Foreign Application Priority Data

Nov. 25, 2016   (CN) .......................... 2016 1 1054075

(51) Int. Cl.
*G06F 16/958*   (2019.01)
*G06F 16/957*   (2019.01)
(Continued)

(52) U.S. Cl.
CPC ............ *G06F 16/958* (2019.01); *G06F 9/451* (2018.02); *G06F 16/9577* (2019.01); *G06F 40/14* (2020.01)

(58) Field of Classification Search
CPC .... G06F 16/958; G06F 9/451; G06F 16/9577; G06F 40/14
(Continued)

(56) References Cited

U.S. PATENT DOCUMENTS

| | | | | |
|---|---|---|---|---|
| 6,476,833 | B1 * | 11/2002 | Moshfeghi | G06F 16/9535 |
| | | | | 715/854 |
| 2002/0087596 | A1 * | 7/2002 | Lewontin | G06F 16/986 |
| | | | | 715/234 |

(Continued)

FOREIGN PATENT DOCUMENTS

| | | | |
|---|---|---|---|
| CN | 103473347 | A | 12/2013 |
| CN | 105630902 | A | 6/2016 |

(Continued)

OTHER PUBLICATIONS

Zhang, Kaimin, et al. "Smart Caching for Web Browsers." Proceedings of the 19th International Conference on World Wide Web—WWW '10, 2010, doi:10.1145/1772690.1772741. (Year: 2010).*

(Continued)

*Primary Examiner* — Stephen S Hong
*Assistant Examiner* — Broderick C Anderson
(74) *Attorney, Agent, or Firm* — Morgan, Lewis & Bockius LLP

(57) ABSTRACT

This application relates to a page rendering method, applied to a terminal. The terminal obtains an updated current node tree, searches the current node tree for a current subtree set, and obtains an identifier corresponding to the current subtree set. The terminal then determines whether the identifier is the same as an identifier of an original subtree set of an original node tree, and reserves an original view node corresponding to the original subtree set on a current page if the identifiers are the same; or generates an updated view node corresponding to the current subtree set if the two (Continued)

identifiers are not the same. Finally the terminal generates an updated page through rendering according to the original view node and the updated view node, and displays the updated page on a graphical user interface of the terminal.

17 Claims, 11 Drawing Sheets

(51) Int. Cl.
 *G06F 9/451* (2018.01)
 *G06F 40/14* (2020.01)
(58) Field of Classification Search
 USPC .......................................................... 715/234
 See application file for complete search history.

(56) References Cited

U.S. PATENT DOCUMENTS

2004/0006743 A1* 1/2004 Oikawa ................. G06F 16/972
 715/255
2004/0123239 A1* 6/2004 Roessler ............... G06F 16/957
 715/744
2011/0258532 A1* 10/2011 Ceze ................... G06F 16/9574
 715/234
2012/0110437 A1* 5/2012 Pan ..................... G06F 16/9574
 715/235

FOREIGN PATENT DOCUMENTS

| CN | 105808237 A | 7/2016 |
| CN | 106126645 A | 11/2016 |
| CN | 106598574 A | 4/2017 |

OTHER PUBLICATIONS

Tencent Technology, Written Opinion, PCT/CN2017/111274, dated Feb. 14, 2018, 4 pgs.
Tencent Technology, IPRP, PCT/CN2017/111274, May 28, 2019, 5 pgs.
Tencent Technology, ISR, PCT/CN2017/111274, Feb. 14, 2018, 2 pgs.

* cited by examiner

<block wx: for = "{{list}}" wx:for-item = "item wx:key = "account">

<view> Account: {{item.account}} </view>

<view wx: if = "{{item.amount>0}}"> {{item.account}}, Amount of money:{{item.amount}} </view>

<view wx: else> Insufficient balance </view>

</block>

<view class = "bluebar"> Other content </view>

PAGE RENDERING METHOD, DEVICE, AND DATA STORAGE MEDIUM

CROSS-REFERENCE AND RELATED APPLICATIONS

This application is a continuation application of PCT/CN2017/111274, entitled "PAGE RENDERING METHOD, DEVICE, AND DATA STORAGE MEDIUM" filed on Nov. 16, 2017, which claims priority to Chinese Patent Application No. 201611054075.3, entitled "PAGE RENDERING METHOD AND APPARATUS" filed with the Patent Office of China on Nov. 25, 2016, all of which are incorporated by reference in their entirety.

FIELD OF THE TECHNOLOGY

This application relates to the field of computer technologies, and in particular, to a page rendering method, an apparatus, and a storage medium.

BACKGROUND OF THE DISCLOSURE

With the development of computer technologies, a user may install various applications on a terminal, so that a page is displayed in the application or displayed by using a browser, and the user browses the page and obtains content that the user is interested in.

A computer displays a page through rendering. Rendering is a process of displaying program code in a browser window or an internal window of an application according to a form rule. When the page is updated, updated program code usually needs to be re-converted into updated page view data, and then the page is displayed according to the updated page view data. It takes a large amount of time to convert the program code into the page view data, causing low page updating and displaying efficiency.

SUMMARY

In view of this, it is necessary to provide a page rendering method and apparatus for the foregoing technical problem, to improve the page updating and displaying efficiency.

A first aspect of this application provides a page rendering method performed at a terminal having one or more processors and memory storing programs to be executed by the one or more processors, the method comprising:

obtaining an updated current node tree;

searching the current node tree for a current subtree set;

obtaining an identifier corresponding to the current subtree set;

determining whether the identifier is the same as an identifier of an original subtree set of an original node tree;

in accordance with a determination that the two identifiers are the same, reserving an original view node corresponding to the original subtree set on a current page;

in accordance with a determination that the two identifiers are not the same, generating an updated view node corresponding to the current subtree set; and generating an updated page through rendering according to the original view node and the updated view node, and displaying the updated page on a graphical user interface of the terminal.

A second aspect of this application further provides a terminal, comprising one or more processors; memory coupled to the one or more processors; and a plurality of computer programs stored in the memory that, when executed by the one or more processors, cause the terminal to perform the aforementioned page rendering method.

A third aspect of this application further provides a non-transitory computer readable storage medium storing a plurality of instructions in connection with a terminal having one or more processors, wherein the plurality of instructions, when executed by the one or more processors, cause the terminal to perform the aforementioned page rendering method.

DESCRIPTION OF EMBODIMENTS

Figure 1:
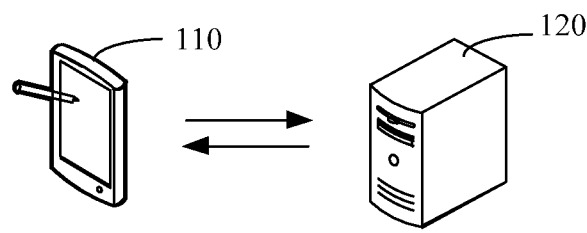
FIG. 1 is a diagram of an application environment of a page rendering method in an embodiment.

FIG. 1 is a diagram of an application environment in which a page rendering method is run according to an embodiment. As shown in FIG. 1, the application environment includes a terminal 110 and a server 120, where the terminal 110 communicates with the server 120 by using a network.

The terminal 110 may be a smartphone, a tablet computer, a notebook computer, a desktop computer, or the like, but is not limited thereto. The terminal 110 may obtain page structure data from the sever 120 and display a current page. When updating the current page, the terminal 110 performs addictive rendering by comparing an identifier corresponding to a current subtree set of a current node tree and an identifier of an original subtree set of an original node tree. Only an addictive amount is required for generating an updated view node, and view nodes corresponding to the entire current node tree do not need to be generated, so that a page rendering time is reduced, and the page updating efficiency can be improved.

Figure 2:
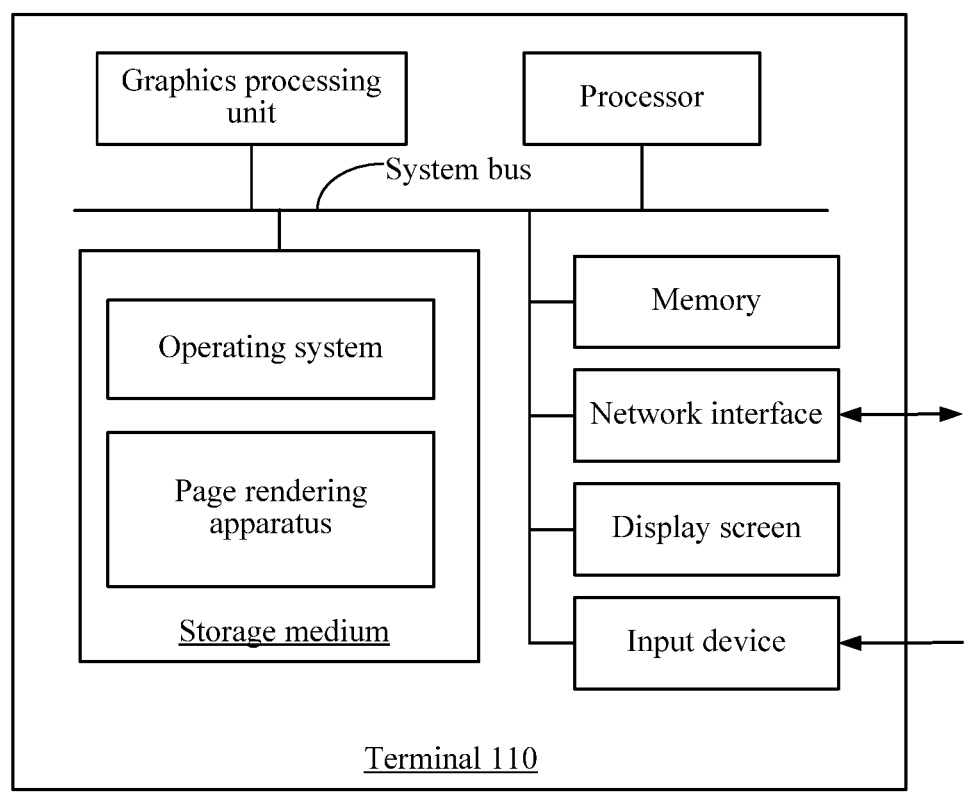
FIG. 2 is a diagram of an internal structure of a terminal in FIG. 1 in an embodiment.

In an embodiment, an internal structure of the terminal 110 in FIG. 1 is shown in FIG. 2. The terminal 110 includes a processor, a graphics processing unit, a storage medium, a memory, a network interface, a display screen, and an input device that are connected to each other by using a system bus. The storage medium of the terminal 110 may be a memory which stores an operating system therein, and further includes a page rendering apparatus, where the apparatus is configured to implement a page rendering method applicable to the terminal. In another example, the storage medium of the terminal may be a non-volatile storage medium, storing a computer program therein. The computer program is used to perform a page processing method described in the foregoing embodiments. The processor is configured to provide computing and control capabilities, to support running of the entire terminal 110. The graphics processing unit in the terminal 110 is configured to provide at least a drawing capability of a display interface, for example, rendering a page. The memory provides an environment for running of a page rendering apparatus in the storage medium. The network interface is configured to perform network communication with the server 120, for example, receive page structure data sent by the server 120. The display screen is configured to display an application interface and the like. The input device is configured to receive a command, data, or the like entered by a user. For the terminal 110 having a touchscreen, the display screen and the input device may be touchscreens. The display screen may be a graphical user interface (GUI, Graphical User Interface). FIG. 2 is merely a block diagram of some structures related to the solution of this application, and does not constitute a limitation on the terminal to which the solution of this application is applied. Specifically, the terminal may include more or less components than those shown in the figure, or combine some components, or have different component deployments.

Figure 3:
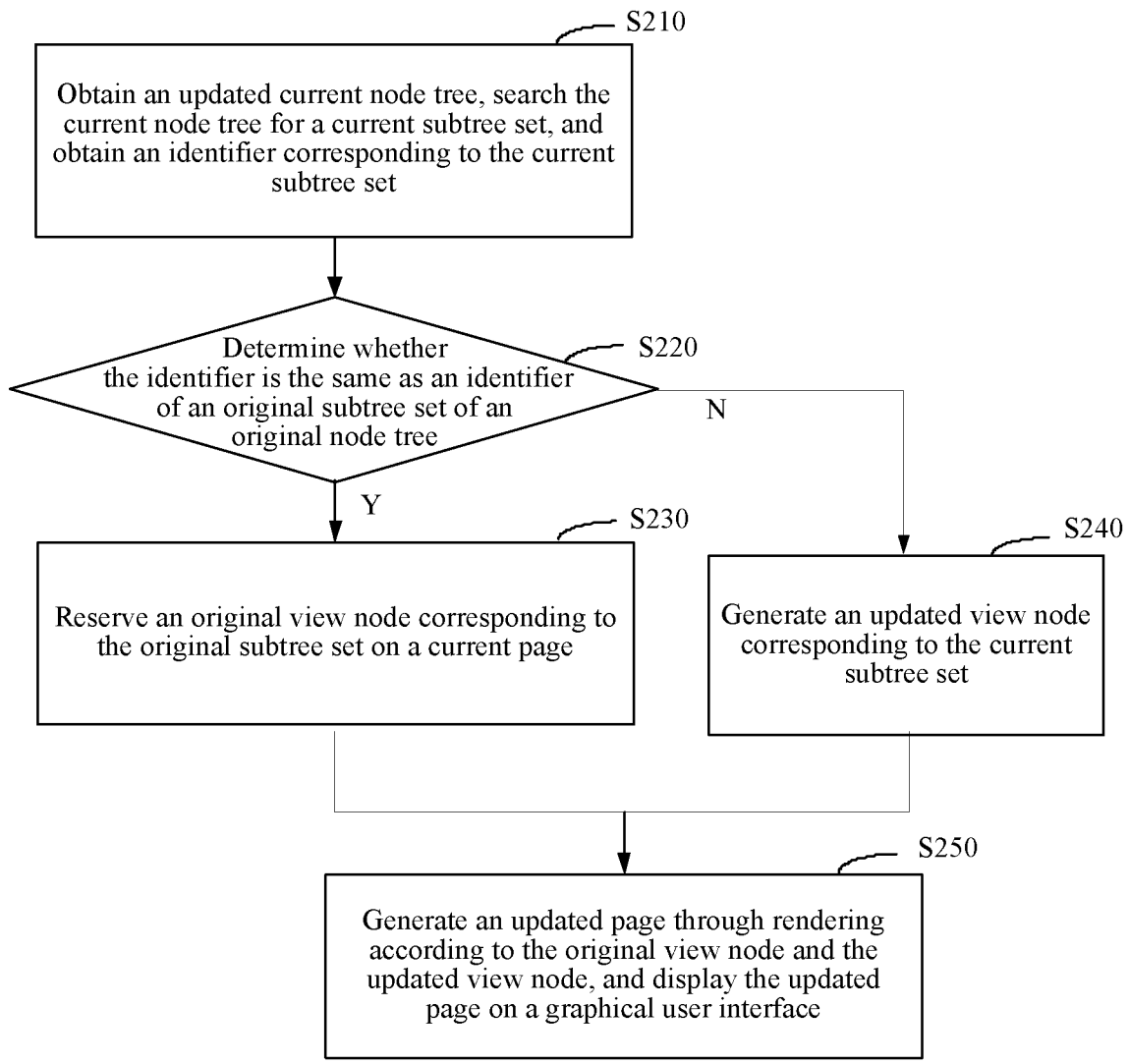
FIG. 3 is a flowchart of a page rendering method in an embodiment.

In an embodiment, as shown in FIG. 3, a page rendering method is provided. The method applied to the terminal in the foregoing application environment is used as an example for description, and the method includes the following steps:

Step S210: Obtain an updated current node tree, search the current node tree for a current subtree set, and obtain an identifier corresponding to the current subtree set.

Specifically, a node tree is a tree-shaped data structure in which elements in page structure data are used as nodes, and there is a father node-child node relationship from top to down. A child node in the node tree may be referred to as a subtree. The node tree may be a standard data structure that can be directly parsed by a front end, or may be a self-defined tree-shaped data structure that needs to be converted into a standard data structure. A subtree set is a set formed by one or more subtrees in which different subtrees have an association relationship and have features and statuses independent of each other. For example, a user account subtree and an account limit subtree corresponding to a user account form a subtree set, and when the user account is unchanged, the corresponding account limit may remain unchanged during page updating next time. Each subtree set may be distinguished by setting a preset node or setting a preset attribute or presetting a text character string. Each subtree set has a corresponding an identifier. The identifier is unique, and the identifier may be an attribute value of a variable corresponding to the subtree set. The attribute value is a unique character string or digital, or may be a cyclic variable. It is required that the variable is a unique character string or digital.

Step S220. Determine whether the identifier is the same as an identifier of an original subtree set of an original node tree, and proceed to step S230 if the identifiers are the same, otherwise, proceed to step S240.

Specifically, if the identifier of the original subtree set of the original node tree is the same as the identifier of the current subtree set of the current node tree, it indicates that there are already view nodes corresponding to the subtree set on the current page, and the view nodes do not need to be created. Because it needs a large amount of time to convert a node tree to view data corresponding to the node tree and display the view data on a page through rendering, in this embodiment, different processing steps are proceeded to according to the identifier of the current subtree set, and when there are view nodes whose original features and statuses need to be maintained in the updated page, the view data does not need to be re-generated, thereby improving a rendering speed.

Step S230. Reserve an original view node corresponding to the original subtree set on a current page.

Figure 4:
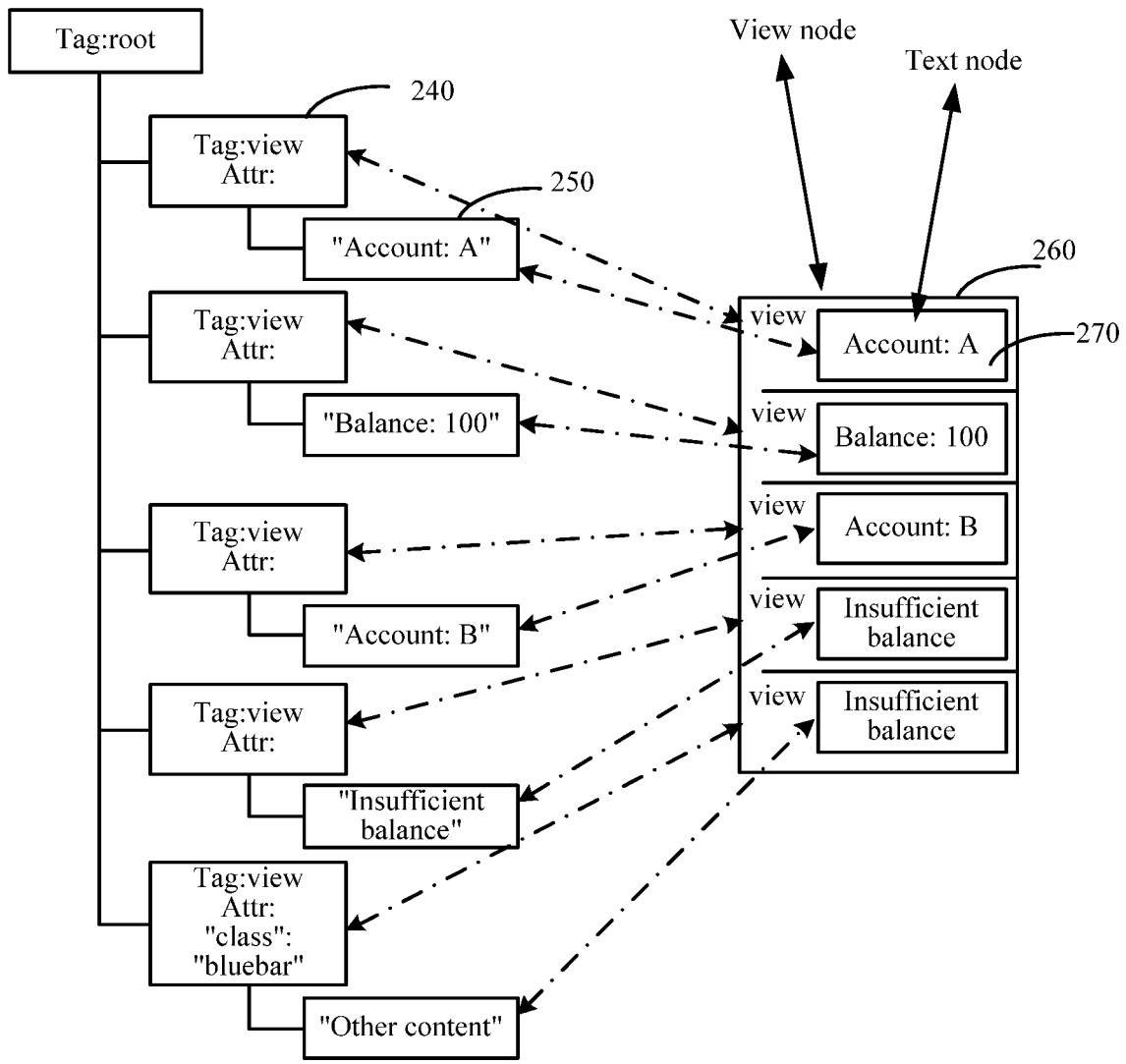
FIG. 4 is a diagram of a correspondence between a subtree and a view node in an embodiment.

Specifically, the view node is view data that is displayed on the page and that corresponds to a subtree. As shown in FIG. 4, FIG. 4 shows a correspondence between each subtree in a subtree set and the view node. A subtree 240 corresponds to a view mode 260, and a subtree 250 corresponds to a view text node 270. An original view node corresponding to the current subtree set the same as the identifier of the original subtree set of the original node tree is obtained, and the original view node is reserved, so that re-drawing is not required, thereby reducing rendering time.

Step S240. Generate an updated view node corresponding to the current subtree set.

Specifically, the current subtree set different from the identifier of the original subtree set of the original node tree may be a newly added subtree set, or may be the original subtree set in which data changes. In this case, re-drawing needs to be performed, the current subtree set is parsed, and a corresponding updated view node is generated through rendering.

Step S250. Generate an updated page through rendering according to the original view node and the updated view node, and display the updated page on a graphical user interface of the terminal.

Specifically, the original view node and the updated view node are deployed according to a structure of the current node tree. For example, the original view node and the updated view node are sorted and inserted to obtain a corresponding displaying position, to generate the updated page through rendering.

In this embodiment, the updated current node tree is obtained, the current node tree is searched for the current subtree set, the identifier corresponding to the current subtree set are obtained, whether the identifier is the same as the identifier of the original subtree set of the original node tree is determined, and the original view node corresponding to the original subtree set on the current page is reserved if the identifiers are the same, or if the identifier are not the same, the updated view node corresponding to the current subtree set is generated. The updated page is generated through rendering according to the original view node and the updated view node. The identifier corresponding to the current subtree set of the current node tree are compared with the identifier of the original subtree set of the original node tree. The view node that does not need to be changed in the page is identified, and the view node that does not need to be re-drawn is reserved. The updated view node only needs to be incrementally generated for incremental rendering, and a view node corresponding to the whole current node tree does not need to be generated. Therefore, page rendering time is reduced, and the page updating efficiency can be improved.

Figure 5:
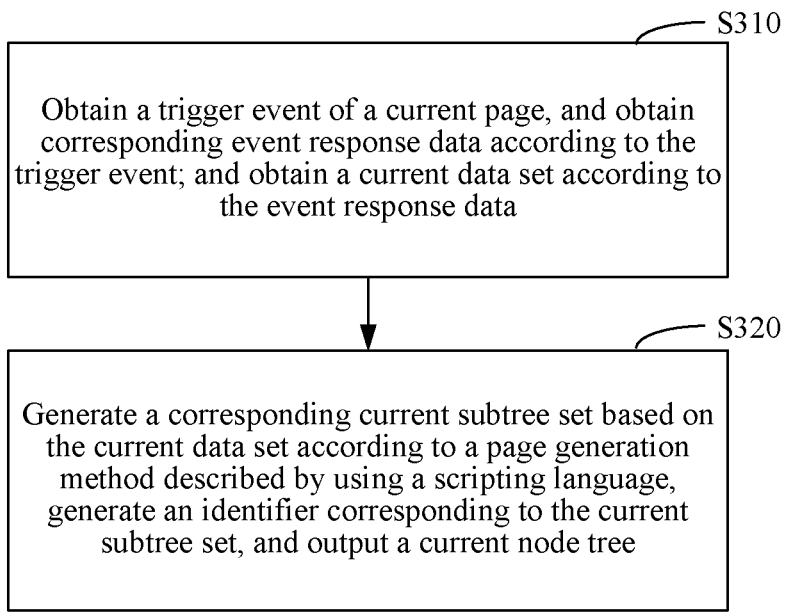
FIG. 5 is a flowchart of generating a current node tree in an embodiment.

In an embodiment, as shown in FIG. 5, before step S210, the step further includes:

Step S310. Obtain a trigger event of the current page, and obtain corresponding event response data according to the trigger event; and obtain a current data set according to the event response data.

Specifically, each trigger event corresponds to a matching event response, so that an event type of the trigger event may be determined first, and then the event is processed by using logic code that matches the event type and that is in page logic code, to obtain corresponding event response data.

Step S320. Generate a corresponding current subtree set based on the current data set according to a page generation method described by using a scripting language, generate an identifier corresponding to the current subtree set, and output the current node tree.

Specifically, the scripting language is a programming language, for example, the JavaScript scripting language or the VBScript, and a specific type of the scripting language is not limited. The page generation method is logic that is programmed by using the scripting language and that is used for outputting a node tree according to a data variable set. Because the method is described by using the scripting language in which there is no extensible self-defined syntax, a client may directly parse the method, for example, parse the method by using a browser or a webview. The page generation method includes page generation method segments corresponding to the data variable set in different logic conditions, so that a corresponding target page generation method segment may be obtained according to logic conditions satisfied by different data variable sets. A corresponding node tree is output according to the target page generation method segment, and different node trees may be parsed and rendered to obtain different view nodes, so that a page view is updated as the node tree is updated. The output node tree includes subtree sets formed according to preset conditions, and each subtree set may update corresponding features and statuses according to a current data set in a page updating process.

The data variable set is a set of all variables that need to be transferred to the page generation method in a page displaying process. In the page displaying process, the event response data may be obtained in an operation performed on the page, and values are assigned to the variables in the data variable set to obtain a current data set, so that the page is updated. For example, buttons on the page are clicked to obtain current data bound to the buttons, and data displayed on the page is updated to the current data. The current data may be updated data corresponding to an original view node, or may be data required when a view node is newly added. Corresponding an identifier are set for the current subtree set according to the current data, and if the current data is the same as data corresponding to the page before updating, the identifier of the current subtree set is the same as those of the original subtree set. If the current data corresponds to a newly added subtree set, an identifier corresponding to the newly added subtree set are unique an identifier that do not exist in the original subtree set.

In this embodiment, event responses corresponding to events may be self-defined as required, so that it is convenient and flexible to update values of data variables by using preset logic by triggering an event. Moreover, the identifier corresponding to the subtree set are set according to the updated data set, and an updated node tree is generated, so that subsequently, the new page can be rapidly rendered according to the identifier corresponding to the subtree set.

In an embodiment, the page generation method is generated by compiling initial page structure data that is generated by using an extensible markup language.

Specifically, the markup language is a text code that combines text and other text-related information to display details about file structures and data processing, and the extensible markup language is a self-defined markup language that is extended based on an Extensible Markup Language (XML). Initial page structure data generated by using the Extensible Markup Language may conveniently and flexibly describe a page structure by using a self-defined syntax structure. The initial page structure data generally includes different labels. Each label has data such as a label attribute and label content. The label attribute may be a control attribute, and the label content may include an expression, text content, and the like. The label attribute is used to polish the label, for example, define a format of the label and data needed by the label. Each element forming the initial page structure data needs to be analyzed, and data processing logic in the element is obtained, so that logic and data carried in each label is converted into the page generation method in which the data variable set is used as an input and the node tree is used as an output. Because the node tree is a data structure that is already compiled and in which there is a node relationship, the node tree does not need to be parsed again by the terminal. When a front end obtains the node tree, the node tree may be directly converted into a standard data structure that can be parsed by the front end and that carries a node relationship, so that the page is rendered rapidly.

In an embodiment, step S210 of searching the current node tree for a current subtree set includes: determining whether there is a virtual node in the node tree, and obtaining a subtree wrapped by the virtual node if there is a virtual node in the node tree, to obtain the current subtree set.

Specifically, the virtual node is only used to identify a subtree set, and cannot be rendered into a final view. Each virtual node corresponds to one subtree set, and has an identifier corresponding to the subtree set. The identifier of the subtree set may be used as an attribute of the virtual node. The virtual node includes a start node and an end node corresponding to the virtual node, and a part between the start node and the end node forms the subtree set. The virtual node may be set through logic determining according to identification performed on a type of a subtree. it is simple and convenient that the current subtree set may be obtained through rapid identification by using the virtual node, and contrast on character strings does not need to be performed.

Figure 6:
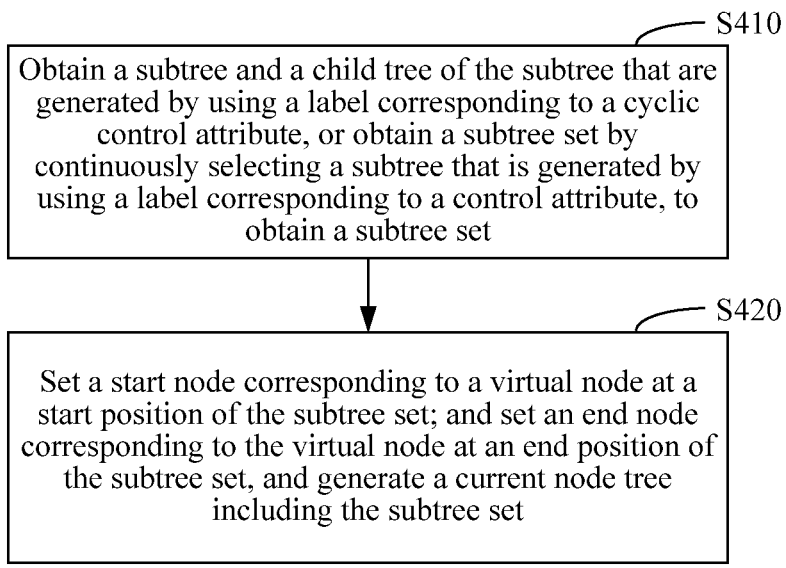
FIG. 6 is a flowchart of generating a current node tree according to another embodiment.

In an embodiment, as shown in FIG. 6, before step S210, the method further includes:

Step S410. Obtain a subtree and a child tree of the subtree that are generated by using a label corresponding to a cyclic control attribute, or obtain a subtree set by continuously selecting a subtree that is generated by using a label corresponding to a control attribute, to obtain a subtree set.

Specifically, the cyclic control attribute is bound to an array, that is, each piece of data in the array may be used to repeatedly render a target object. For example, the target object may be a list. The cyclic control attribute may correspond to a plurality of labels. A syntax label is preset, for example, a plurality of nodes is packaged by using a block label, so that a plurality of nodes is rendered at a time. Because objects that are cyclically processed each time have a same structure, a subtree and child trees thereof that are cyclically processed at a time are combined as a component of the substree set. Subtrees generated by continuously selecting labels corresponding to the control attributes are usually independent of each other and used as components of the subtree set.

Step S420. Set a start node corresponding to the virtual node at a start position of the subtree set; and set an end node corresponding to the virtual node at an end position of the subtree set, and generate a current node tree including the subtree set.

Specifically, the subtree set obtained in the previous step is wrapped by using the start node and the end node, to form a relatively independent unit that has features and statuses and generate the current node tree including the subtree set.

In this embodiment, the subtree set is obtained through automatic identification by using the control attribute of the label, so that when code is run, the corresponding current node tree including the subtree set is automatically generated by means of logic determining, and developers do not need to customize the subtree set in the initial page structure data that is generated by using the extensible markup language. The step is simple and convenient.

In an embodiment, step S240 includes: generating standard structure data for describing a view by converting the current subtree set; and generating a corresponding updated view node through rending according to the standard structure data.

Specifically, the current subtree set may be a self-defined tree structure, and the standard structure data for describing a view needs to be generated first through conversion. The standard structure data for describing a view may be a view data structure that can be directly parsed on the terminal, for example, data for generating a hypertext markup language (HTML) through conversion, and then the standard structure data is parsed to generate a corresponding updated view node through rendering. It is more flexible and convenient to use a self-defined tree-shaped structure, and generated pages are more diversified.

In an embodiment, the page is a page of a sub-application in a mother application run on an operating system.

Specifically, a child application is an application program that runs depending on a mother application. The child application may be downloaded, enabled, run, or closed by using the mother application. The mother application may be a social application, a dedicated application for supporting a child application, a file management application, an email application, or a game application. The social application may be an instant messaging application, a social network service (SNS) application, a live application, or the like. The child application is an application that may be implemented in an environment provided by the mother application, and the child application may be specifically a social application, a file management application, an email application, a game application, or the like. A page in each child application may be rendered incrementally, to improve a rendering speed of the page in the child application.

Figures 7, 8:
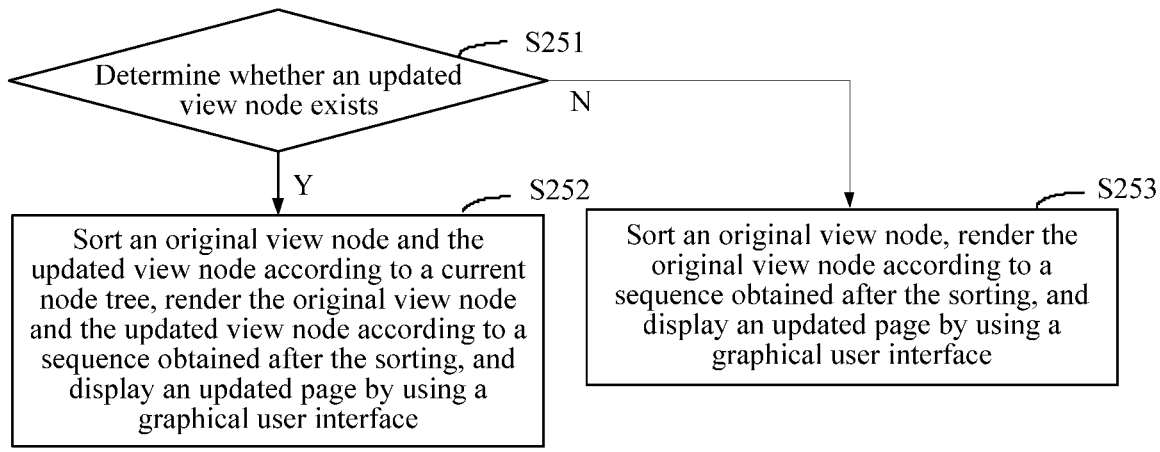
FIG. 7 is a flowchart of performing rendering according to a view node in an embodiment.
FIG. 8 is a diagram of initial page structure data corresponding to a page in a specific embodiment.

In an embodiment, as shown in FIG. 7, step S250 includes:

Step S251. Determine whether the updated view node exists; and if the updated view node exists, proceed to step S252, or otherwise, proceed to step S253.

Specifically, if the updated view node does not exist, it indicates that there is no newly added view data in the updated page, and the page is rendered by modifying locations of the original view data.

Step S252. Sort the original view node and the updated view node according to the current node tree, render the original view node and the updated view node according to a sequence obtained after the sorting, and display the updated page by using the graphical user interface.

Specifically, the updated view node may emerge above or below the original view node or may be inserted into a middle position of the original view node, and a relative position of each node in the original view node may also be adjusted. The original view node and the updated view node are sorted according to a position relationship between the subtree sets in the current node tree, the original view node and the updated view node are rendered according to a target sequence, and the updated page is displayed by using the graphical user interface.

Step S253. Sort the original view node, render the original view node according to a sequence obtained after the sorting, and display the updated page by using the graphical user interface.

Specifically, if there is no newly added updated view node, the original view node may be re-sorted, so that the updated page may be rapidly generated through rendering.

Figure 9:
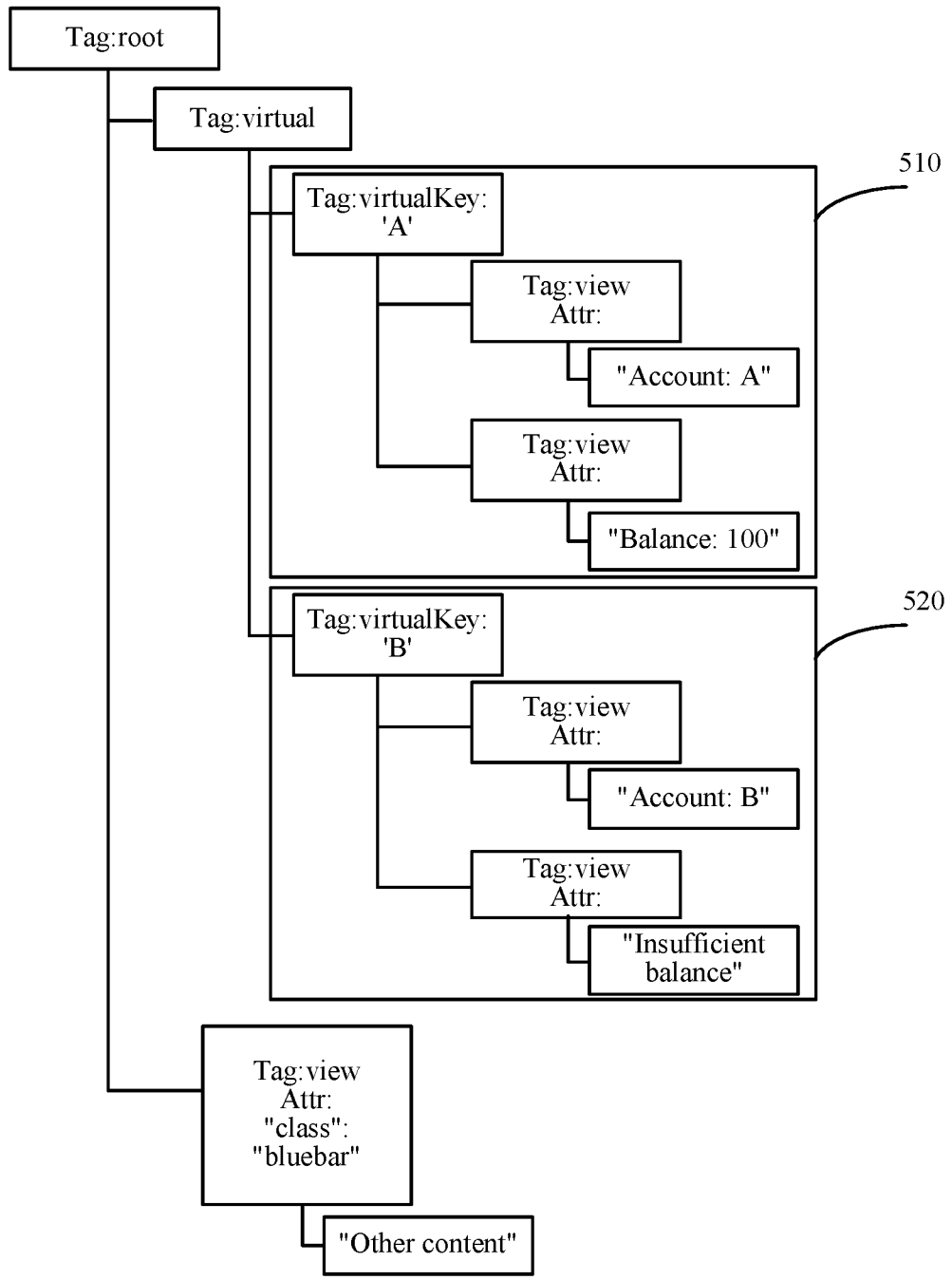
FIG. 9 is a diagram of a logic form of a first node tree in a specific embodiment.
Figure 10:
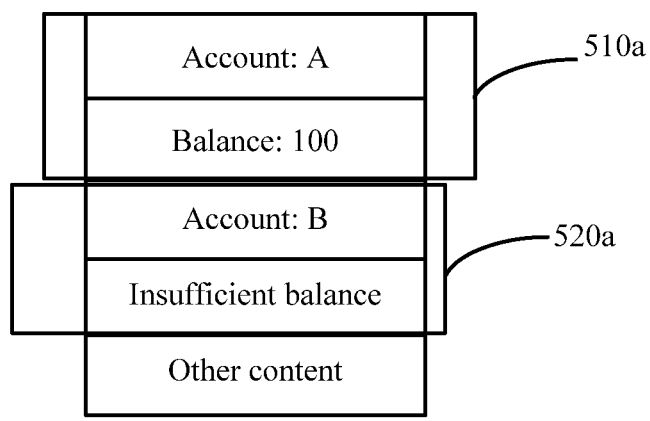
FIG. 10 is a diagram of a page that is generated through rendering according to a first node tree in a specific embodiment.
Figure 11:
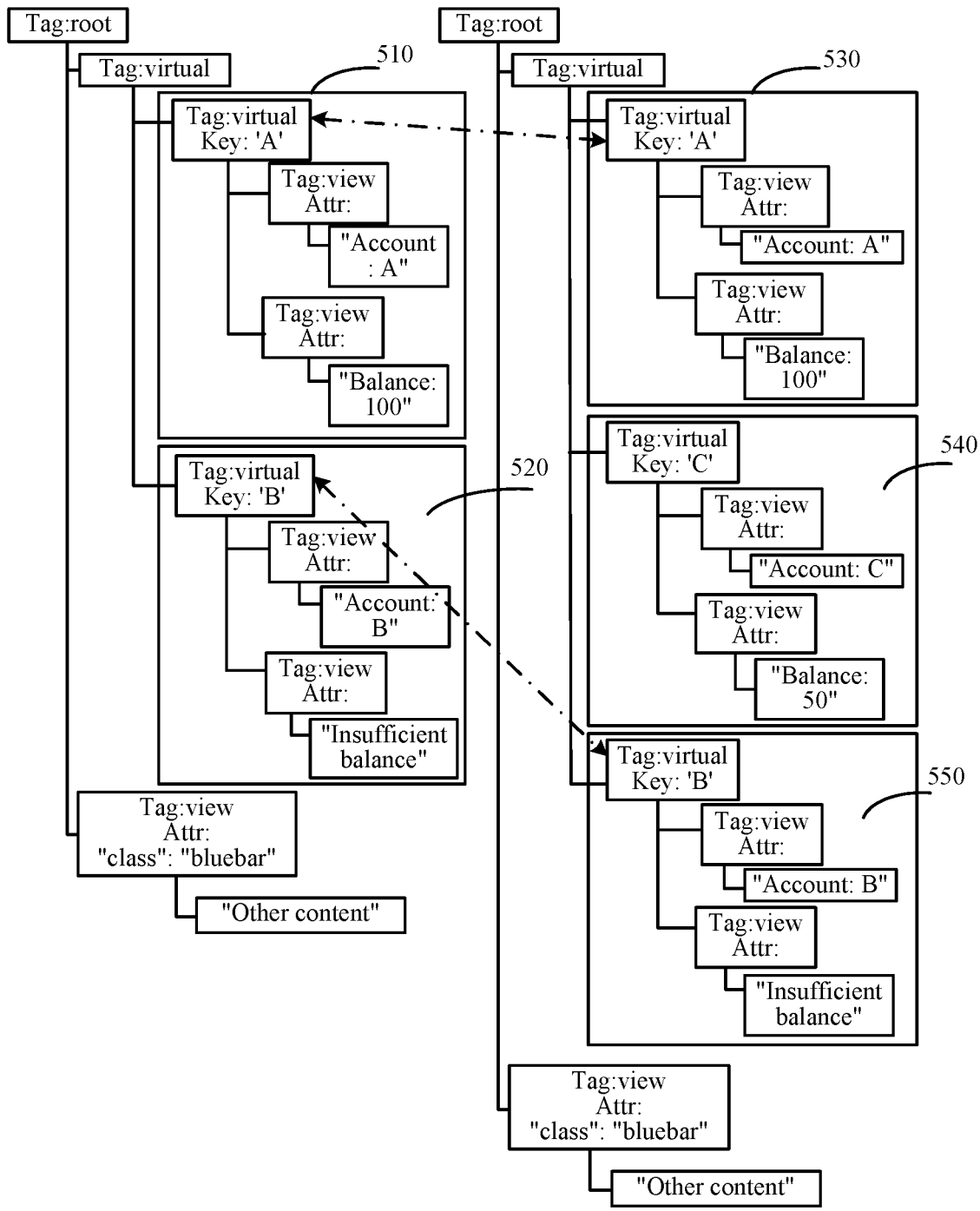
FIG. 11 is a diagram of contrast between a logic form of a first node tree and a logic form of a second node tree in a specific embodiment.

In a specific embodiment, the initial page structure data is shown in FIG. 8, and the identifier of each subtree set are set by using variables key. When input data is
{"list":[{"account":"A","amount":100},{"account":"B", "amount":0}]}, a schematic diagram of a logic form of a generated first node tree is shown in FIG. 9, including a first original subtree set 510 and a second original subtree set 520. An identifier of the first original subtree set are A, and an identifier of the second original subtree set are B. A corresponding page is shown in FIG. 10, and the page includes a first original view node 510a and a second original view node 520a. When input data changes to:
{"list":[{"account":"A","amount":100},{"account":"C", "amount":50"},{"account":"B","amount":0},]}, a schematic diagram of a logic form of a generated second node tree is shown in the right diagram in FIG. 11, including a first current subtree set 530, a second current subtree set 540, and a third current subtree set 550. An identifier of the first current subtree set are A, an identifier of the second current subtree set are C, and an identifier of the third current subtree set are B. The left diagram in FIG. 11 is a schematic diagram of a logic form of the first node tree, forming contrast with the logic form of the second node tree.

Figure 12:
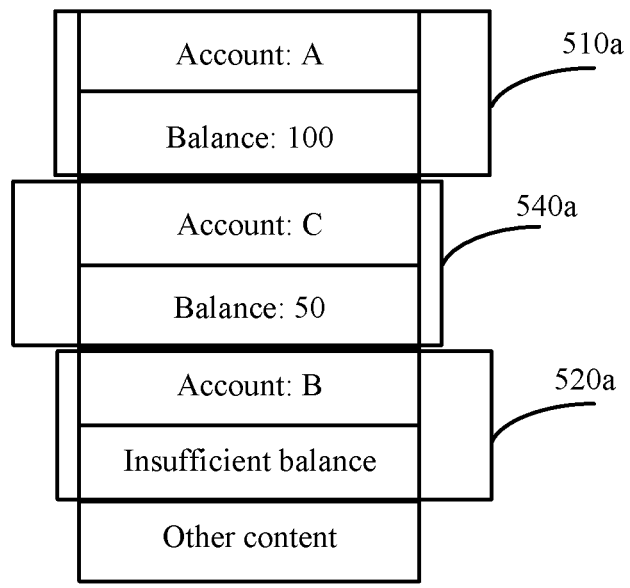
FIG. 12 is a diagram of a page that is generated through rendering according to a second node tree in a specific embodiment.

There are subtree sets whose an identifiers are the same in the first node tree and the second node tree, an identifier of the first current subtree set 530 is the same as an identifier of the first original subtree set 510, and an identifier of the third current subtree set 550 is the same as an identifier of the second original subtree set 520, so that when the page is updated, provided that the updated view node 540a corresponding to the second current subtree set 540 is generated, and the first original view node 510a and the second original view node 520a corresponding to the reserved subtree set are obtained, the updated page can be generated through rapid rendering. The updated page is shown in FIG. 12. The first original view node 510a and the second original view node 520a are view nodes that are reserved when the page is rendered previously, and do not need to be re-created. Therefore, when the page is updated this time, only the updated view node 540a needs to be generated, rendering costs are optimized, thereby improving a render speed.

Figure 13:
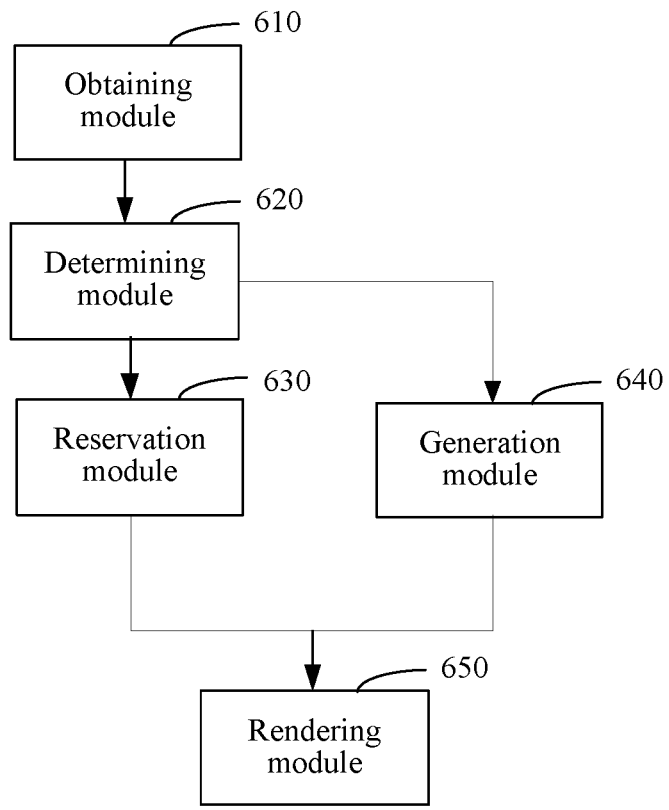
FIG. 13 is a structural block diagram of a page rendering apparatus in an embodiment.

In an embodiment, as shown in FIG. 13, a page rendering apparatus is provided. The apparatus includes:

an obtaining module 610, configured to: obtain an updated current node tree, search the current node tree for a current subtree set, and obtain an identifier corresponding to the current subtree set;

a determining module 620, configured to: determine whether the identifier is the same as an identifier of an original subtree set of an original node tree, and enter a reservation module 630 if the identifiers are the same; otherwise, enter a generation module 640; or a reservation module 630, configured to reserve an original view node corresponding to the original subtree set on a current page;

a generation module 640, configured to generate an updated view node corresponding to the current subtree set; and a rendering module 650, configured to generate an updated page through rendering according to the original view node and the updated view node, and display the updated page on a graphical user interface.

Figure 14:
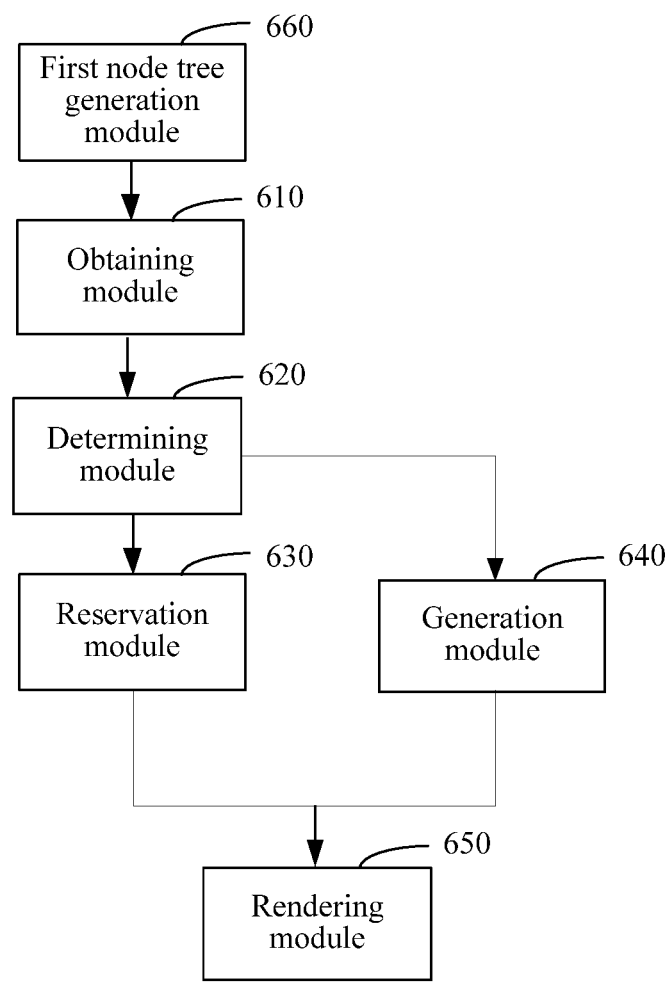
FIG. 14 is a structural block diagram of a page rendering apparatus in another embodiment.

In an embodiment, as shown in FIG. 14, the apparatus further includes:

a first node tree generation module 660, configured to: obtain a trigger event of the current page, obtain a current data set according to the event response data; and generate a corresponding current subtree set based on the current data set according to a page generation method described by using a scripting language, generate an identifier corresponding to the current subtree set, and output the current node tree.

In an embodiment, the page generation method is generated by compiling initial page structure data that is generated by using an extensible markup language.

In an embodiment, the obtaining module 610 is further configured to determine whether there is a virtual node in the node tree, and obtain a subtree wrapped by the virtual node if there is a virtual node in the node tree, to obtain the current subtree set.

Figure 15:
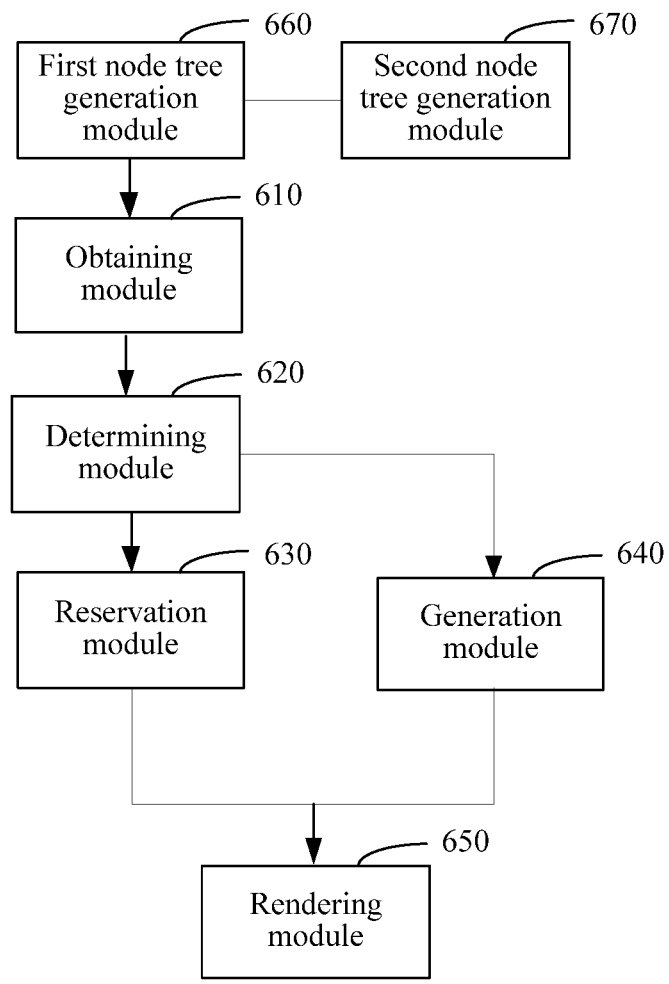
FIG. 15 is a structural block diagram of a page rendering apparatus in still another embodiment.

In an embodiment, as shown in FIG. 15, the apparatus further includes:

a second node tree generation module 670, configured to: obtain a subtree and a child tree of the subtree that are generated by using a label corresponding to a cyclic control attribute, or obtain a subtree set by continuously selecting a subtree that is generated by using a label corresponding to a control attribute, to obtain a subtree set; set a start node corresponding to the virtual node at a start position of the subtree set; and set an end node corresponding to the virtual node at an end position of the subtree set, and generate a current node tree including the subtree set.

In an embodiment, the generation module 640 is further configured to:

generate standard structure data for describing a view by converting the current subtree set; and generate a corresponding updated view node through rending according to the standard structure data.

In an embodiment, the page is a page of a sub-application in a mother application run on an operating system.

Figure 16:
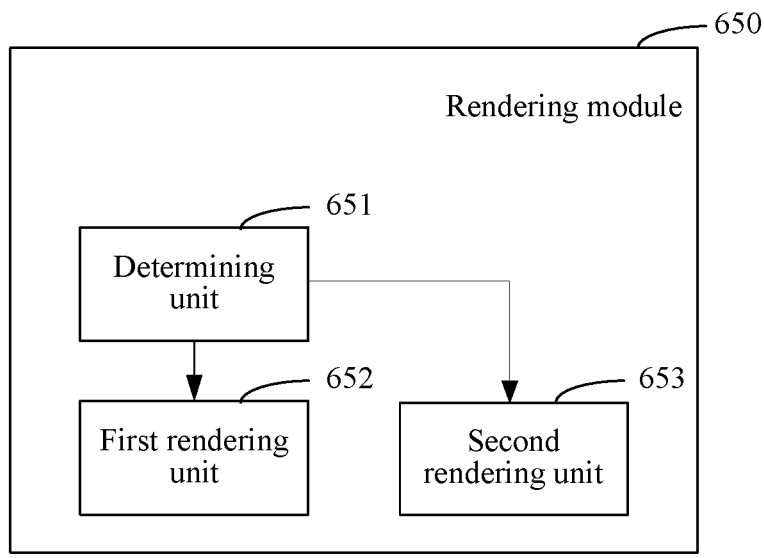
FIG. 16 is a structural block diagram of a rendering module in an embodiment.

In an embodiment, as shown in FIG. 16, the rendering module 650 includes:

a determining unit 651, configured to: determine whether the updated view node exists, and enter a first rendering unit 652, or otherwise, enter a second rendering unit 653;

a first rendering unit 652, configured to: sort the original view node and the updated view node according to the current node tree, render the original view node and the updated view node according to a sequence obtained after the sorting, and display the updated page by using the graphical user interface; and a second rendering unit 653, configured to: sort the original view node, render the original view node according to a sequence obtained after the sorting, and display the updated page by using the graphical user interface.

A person of ordinary skill in the art may understand that all or some of the processes in the methods of the foregoing embodiments may be implemented by a computer program instructing relevant hardware. The program may be stored in a computer readable storage medium. For example, in the embodiments of this application, the program may be stored in a storage medium of a computer system, and is executed by at least one processor in the computer system, to implement the process including the foregoing method embodiments. The storage medium may be a magnetic disk, an optical disc, a read-only memory (ROM), a random access memory (RAM), or the like.

Technical features of the foregoing embodiments may be arbitrarily combined. For brevity of the description, not all possible combinations of the technical features in the foregoing embodiments are described. However, provided that the combinations of the technical features are not contradictory, the combinations shall be considered as the scope recorded in this specification.

The foregoing embodiments only show several implementations of this application and are described in detail, but they should not be construed as a limit to the patent scope of this application. It should be noted that, a person of ordinary skill in the art may further make some variations and improvements without departing from the concept of this application, and the variations and improvements belong to the protection scope of this application. Therefore, the protection scope of the patent of this application shall be subject to the appended claims.

What is claimed is:

1. A page rendering method performed at a terminal having one or more processors and memory storing programs to be executed by the one or more processors, the method comprising:

obtaining an updated current node tree;

searching the current node tree for a current subtree set, further including determining whether there is a virtual node in the current node tree, and obtaining a subtree wrapped by the virtual node if there is a virtual node in the node tree to obtain the current subtree set;

obtaining an identifier corresponding to the current subtree set;

determining whether the identifier is the same as an identifier of an original subtree set of an original node tree;

in accordance with a determination that the two identifiers are the same, reserving an original view node corresponding to the original subtree set on a current page;

in accordance with a determination that the two identifiers are not the same, generating an updated view node corresponding to the current subtree set; and generating an updated page through rendering according to the original view node and the updated view node, and displaying the updated page on a graphical user interface of the terminal.

2. The method according to claim 1, further comprising: before obtaining the updated current node tree:

obtaining a trigger event of the current page, and a corresponding event response data according to the trigger event;

obtaining a current data set according to the event response data; and generating a corresponding current subtree set based on the current data set according to a page generation method described by using a scripting language, generating an identifier corresponding to the current subtree set, and outputting the current node tree.

3. The method according to claim 2, wherein the page generation method is generated by compiling initial page structure data that is generated by using an extensible markup language.

4. The method according to claim 1, further comprising:
before obtaining the updated current node tree,
obtaining a subtree and a child tree of the subtree that are generated by using a label corresponding to a cyclic control attribute, or obtaining a subtree set by continuously selecting a subtree that is generated by using a label corresponding to a control attribute, to obtain a subtree set;
setting a start node corresponding to the virtual node at a start position of the subtree set; and
setting an end node corresponding to the virtual node at an end position of the subtree set, and generating a current node tree comprising the subtree set.

5. The method according to claim 1, wherein the operation of generating an updated view node corresponding to the current subtree set comprises:
generating standard structure data for describing a view by converting the current subtree set; and
generating a corresponding updated view node through rendering according to the standard structure data.

6. The method according to claim 1, wherein the page is a page of a sub-application in a mother application run on an operating system.

7. The method according to claim 1, wherein the operation of generating an updated page according to the original view node and the updated view node comprises:
determining whether the updated view node exists, sorting the original view node and the updated view node according to the current node tree if the updated view node exists, rendering the original view node and the updated view node according to a sequence obtained after the sorting, and display the updated page; or
resorting the original view node if the updated view node does not exist, rendering the original view node according to a sequence obtained after the sorting, and displaying the updated page.

8. A terminal, comprising one or more processors, memory coupled to the one or more processors, and a plurality of computer programs stored in the memory that, when executed by the one or more processors, cause the terminal to perform a page rendering method including a plurality of operations including:
obtaining an updated current node tree;
searching the current node tree for a current subtree set, further including determining whether there is a virtual node in the current node tree, and obtaining a subtree wrapped by the virtual node if there is a virtual node in the node tree to obtain the current subtree set;
obtaining an identifier corresponding to the current subtree set;
determining whether the identifier is the same as an identifier of an original subtree set of an original node tree;
in accordance with a determination that the two identifiers are the same, reserving an original view node corresponding to the original subtree set on a current page;
in accordance with a determination that the two identifiers are not the same, generating an updated view node corresponding to the current subtree set; and
generating an updated page through rendering according to the original view node and the updated view node, and displaying the updated page on a graphical user interface of the terminal.

9. The terminal according to claim 8, wherein the plurality of operations further include:
before obtaining the updated current node tree,
obtaining a trigger event of the current page, and a corresponding event response data according to the trigger event;
obtaining a current data set according to the event response data; and
generating a corresponding current subtree set based on the current data set according to a page generation method described by using a scripting language, generating an identifier corresponding to the current subtree set, and outputting the current node tree.

10. The terminal according to claim 9, wherein the page generation method is generated by compiling initial page structure data that is generated by using an extensible markup language.

11. The terminal according to claim 8, wherein the plurality of operations further include:
before obtaining the updated current node tree,
obtaining a subtree and a child tree of the subtree that are generated by using a label corresponding to a cyclic control attribute, or obtaining a subtree set by continuously selecting a subtree that is generated by using a label corresponding to a control attribute, to obtain a subtree set;
setting a start node corresponding to the virtual node at a start position of the subtree set; and
setting an end node corresponding to the virtual node at an end position of the subtree set, and generating a current node tree comprising the subtree set.

12. The terminal according to claim 8, wherein the operation of generating an updated view node corresponding to the current subtree set comprises:
generating standard structure data for describing a view by converting the current subtree set; and
generating a corresponding updated view node through rending according to the standard structure data.

13. The terminal according to claim 8, wherein the page is a page of a sub-application in a mother application run on an operating system.

14. The terminal according to claim 8, wherein the operation of generating an updated page according to the original view node and the updated view node comprises:
determining whether the updated view node exists, sorting the original view node and the updated view node according to the current node tree if the updated view node exists, rendering the original view node and the updated view node according to a sequence obtained after the sorting, and display the updated page; or
resorting the original view node if the updated view node does not exist, rendering the original view node according to a sequence obtained after the sorting, and displaying the updated page.

15. A non-transitory computer readable storage medium storing a plurality of instructions in connection with a terminal having one or more processors, wherein the plurality of instructions, when executed by the one or more processors, cause the terminal to perform a page rendering method including a plurality of operations including:

obtaining an updated current node tree;
searching the current node tree for a current subtree set, further including determining whether there is a virtual node in the current node tree, and obtaining a subtree wrapped by the virtual node if there is a virtual node in the node tree to obtain the current subtree set;
obtaining an identifier corresponding to the current subtree set;
determining whether the identifier is the same as an identifier of an original subtree set of an original node tree;
in accordance with a determination that the two identifiers are the same, reserving an original view node corresponding to the original subtree set on a current page;
in accordance with a determination that the two identifiers are not the same, generating an updated view node corresponding to the current subtree set; and
generating an updated page through rendering according to the original view node and the updated view node, and displaying the updated page on a graphical user interface of the terminal.

16. The non-transitory computer readable storage medium according to claim 15, wherein the plurality of operations further include:
before obtaining the updated current node tree:
obtaining a trigger event of the current page, and a corresponding event response data according to the trigger event;
obtaining a current data set according to the event response data; and
generating a corresponding current subtree set based on the current data set according to a page generation method described by using a scripting language, generating an identifier corresponding to the current subtree set, and outputting the current node tree.

17. The non-transitory computer readable storage medium according to claim 16, wherein the page generation method is generated by compiling initial page structure data that is generated by using an extensible markup language.

* * * * *